United States Patent
Amoroso et al.

(10) Patent No.: US 7,953,846 B1
(45) Date of Patent: May 31, 2011

(54) INTERNET SECURITY UPDATES VIA MOBILE PHONE VIDEOS

(75) Inventors: Edward Amoroso, Florham Park, NJ (US); David Gibbon, Middletown, NJ (US); Rittwik Jana, Montville, NJ (US); Barbara Laing, Middletown, NJ (US); Huajie Liu, Morganville, NJ (US); Daniel Rubin, Bedminster, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 955 days.

(21) Appl. No.: 11/321,060

(22) Filed: Dec. 30, 2005

Related U.S. Application Data (60) Provisional application No. 60/736,321, filed on Nov. 15, 2005.

(51) Int. Cl.
*G06F 15/173* (2006.01)

(52) U.S. Cl. .................... 709/224; 709/219; 709/223

(58) Field of Classification Search .......... 709/219, 709/204, 231, 206; 379/37; 713/201; 455/466, 455/412.1; 345/802
See application file for complete search history.

(56) References Cited

U.S. PATENT DOCUMENTS

| | | | | |
|---|---|---|---|---|
| 7,286,817 | B2 * | 10/2007 | Provost et al. | 455/412.1 |
| 7,343,168 | B2 * | 3/2008 | Valloppillil | 455/466 |
| 7,373,395 | B2 * | 5/2008 | Brailean et al. | 709/219 |
| 2004/0092272 | A1 * | 5/2004 | Valloppillil | 455/466 |
| 2004/0125148 | A1 * | 7/2004 | Pea et al. | 345/802 |
| 2004/0250133 | A1 * | 12/2004 | Lim | 713/201 |
| 2005/0076109 | A1 * | 4/2005 | Mathew et al. | 709/223 |
| 2006/0010199 | A1 * | 1/2006 | Brailean et al. | 709/204 |
| 2006/0109113 | A1 * | 5/2006 | Reyes et al. | 340/541 |
| 2006/0150248 | A1 * | 7/2006 | Ross et al. | 726/22 |
| 2007/0094333 | A1 * | 4/2007 | Schilling et al. | 709/206 |

FOREIGN PATENT DOCUMENTS

GB    2377143 A   * 12/2002

OTHER PUBLICATIONS

Hi-DRA: Intrusion Detection for Internet Security; Kemmerer, R.A.; Vigna, G.; Proceedings of the IEEE, vol. 93, Issue 10, Oct. 2005, pp. 1848-1857; Digital Object Identifier 10.1109/JPROC.2005.853547.*

Citadel's 2 Minute Warning Provides Early Defense Intelligence Against Worms and Other Cyber Security Threats (printed from www.marketwire.com/mw/release_html_b1?release_id=93304), dated Aug. 17, 2005.

* cited by examiner

*Primary Examiner* — Nathan Flynn
*Assistant Examiner* — Najeeb Ansari
(74) *Attorney, Agent, or Firm* — Moazzam & Associates, LLC (57) ABSTRACT

Information relevant to internet security is received at a data center server. Such information, for example, a network intrusion alert or details on a recent outbreak of an network virus, may be examined to determine the nature and scope of the security-related information. A security alert is promptly generated in response to the information, using previously stored multimedia content divided into categories of security alerts and/or multimedia content generated at the data center shortly after receiving the security information. The security alert is then disseminated to a plurality of mobile device users. The alerts may be disseminated only to the users associated with a certain security event category, or may be sent to different groups of users depending on other relevant criteria.

20 Claims, 6 Drawing Sheets

INTERNET SECURITY UPDATES VIA MOBILE PHONE VIDEOS

This application claims priority to the provisional U.S. application 60/736,321 filed on Nov. 15, 2005, having the title "INTERNET SECURITY NEWS NEWORK," and on which the cover sheet inadvertently displays the title "INTERNET SECURITY UPDATES VIA MOBILE PHONE VIDEOS." Said provisional U.S. application is incorporated herein by reference in its entirety for all purposes.

BACKGROUND

Information technology professionals rely on receiving current and accurate system and network security information. A security threat on the network, such as an internet virus outbreak or an intrusion onto a private network, must be detected and acted upon quickly to protect the resources on the system. Many common systems provide passive notifications, such as web pages, which are updated by an administrator when new information becomes available. A user may log on and browse to the web page to view the current network status and a listing of current or past security alerts. Active notifications may also be sent to subscribers through electronic mail (email), pager, voice mail, fax, SMS, or instant messaging. Such notifications may arrive in a subscribers mailbox, in the case of email or voice mail, or may be presented on the subscriber's computer terminal.

Handheld mobile devices have opened up new possibilities for remotely sending and receiving information. However, until recently, the limited power, storage capacity, communications bandwidth, and user interface capabilities of these devices have limited their effective presentation of multimedia data. Today, many current handheld devices can quickly retrieve and present robust audio and video data. For example, multimedia content such as streaming video webcasts are now supported by a wide array of mobile devices. However, internet security alerts, system information, and the like, are not typically provided in such forms. The need to rapidly disseminate this information to users often prevents the production of high-quality multimedia data. Instead, simple text, HTML, or the like are used to convey current security information. Rich multimedia content on such topics, if generated at all, may only be generated much later, after recording and producing video to convey the information.

Accordingly, there is a need to provide internet security alerts to mobile devices with streaming video technology. Current systems may not sufficiently provide multimedia content to currently and accurately describe an event, such as a system or network status update, and current internet security threat, or related breaking news item. Such multimedia data may be merely posted passively for users to observe, or may instead be transmitted to subscribers only after the lengthy production of a multimedia presentation.

SUMMARY

According to one aspect of the present disclosure, security related data may be received at a server or central location, such as, for example, a network security data center. The security related data may originate from local or remote sources, such as antivirus and internet monitoring software connected to a customer's network, or other news sources. The data center may store different prerecorded multimedia video streams corresponding to different known types of internet security alerts. When new security related data arrives at the data center, the content of the new data may be examined to learn the type or category of a potential security alert to be based on this new data. When the security related data is validated, and a determination is made to send out a security alert to some or all of the registered system users or subscribers, then a corresponding prerecorded multimedia video stream may be selected and transmitted as a security alert to the registered mobile devices of the appropriate system users.

According to another aspect of the present disclosure, a prerecorded multimedia security alert may be customized by human or automated actions in the data center before being transmitted, in order to provide users with specific information about this new alert. There are different ways to quickly customize a prerecorded multimedia security alert before sending the alert. A relevant portion of the received security data may be determined by examining the data, and may itself be incorporated into the alert. Additionally, new related multimedia content may be produced at the data center and added to the prerecorded security alert, for example customized news report may be recorded by personnel at the data center and incorporated into the security alert to further describe the received security information.

According to another aspect of the present disclosure, the set of users chosen to receive an internet security alert may be determined from user/subscriber information stored at the data center. The user's location, hardware or software configuration, and alert-receiving preferences, along with the size and technical sophistication of the user's organization, and the technical capabilities of a particular user's mobile device may be relevant to determine the set of users that receive a specific internet security alert, and how that alert is transmitted.

These and other aspects of the disclosure will be apparent upon consideration of the following detailed description of illustrative embodiments.

BRIEF DESCRIPTION OF THE DRAWINGS

Having thus described the invention in general terms, reference will now be made to the accompanying drawings, which are not necessarily drawn to scale, and wherein:

DETAILED DESCRIPTIONS OF ILLUSTRATIVE EMBODIMENTS

Illustrative embodiments will now be described more fully with reference to the accompanying drawings. The embodiments set forth herein should not be viewed as limiting;

rather, these embodiments are provided merely as examples of the concepts described herein.

Figure 1:
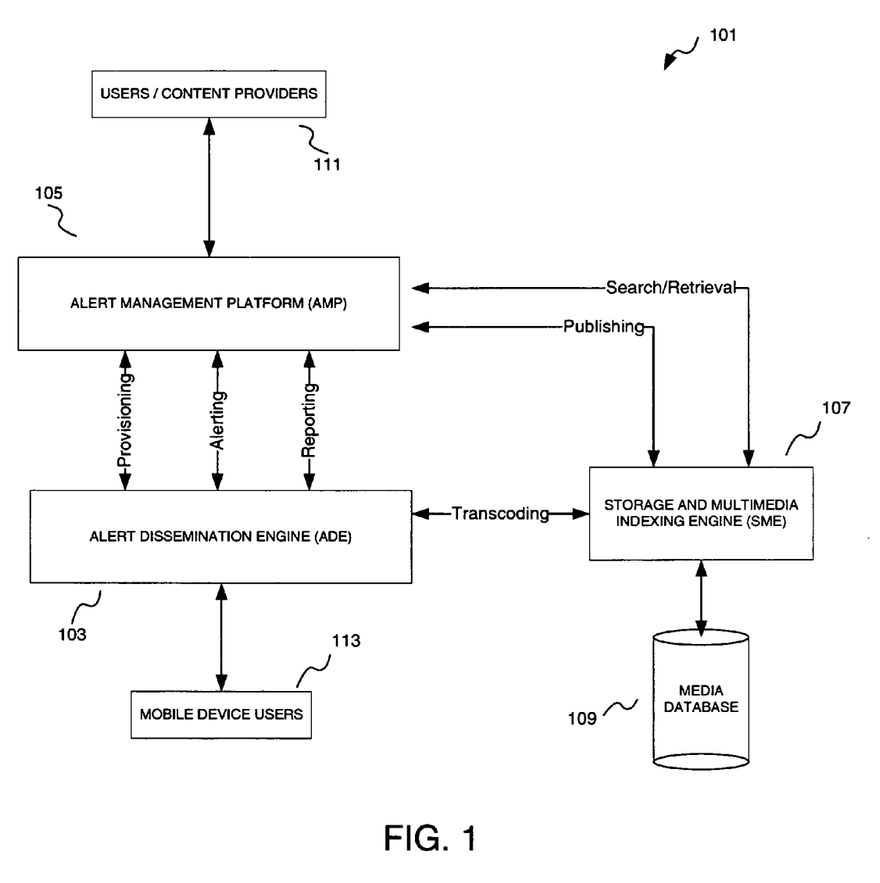
FIG. 1 is a schematic block diagram showing a system architecture in accordance with an embodiment of the present disclosure.

FIG. 1 is an architecture diagram of a system 101 in accordance with certain illustrative embodiments. This example is based on the architecture of the Video2Cell application of AT&T's InternetProtect® software. An alert dissemination engine (ADE) 103 is a middleware platform at the heart of the multimedia internet alert system. As described below, the different components of the ADE 103 may be implemented as a set of WebServices. When an internet alert is to be delivered to a set of recipients, it may be subject to a set of constraints regarding delivery order, acknowledgement, etc., the ADE 103 handles the message dissemination and maintains the status of the dissemination process execution. The ADE 103 may only deliver alerts to trusted entities, accordingly, an alert provisioning process may occur prior to any alert request in order to pre-provision recipient users 113. During this pre-provisioning process, a number of users 113 are declared inside the ADE 103 together with the addresses where they can be reached. As discussed in detail below, an address is represented as a delivery channel/protocol dependent string.

The ADE 103 may also maintain a report describing the current execution stage that can be retrieved at any time by a client. To retrieve a report, a user 111 may issue a request through the reporting interface of the Alert Management Platform (AMP) 105, specifying a user address, or endpoint, to retrieve a snapshot of this report.

The ADE 103 functionality may be made available through service interfaces, such as, for example a provisioning interface, a notification interface, and a reporting interface. In certain embodiments, an acknowledgement interface is also offered to end users. Finally, an alert posting interface may allow handshaking between the ADE 103 and the AMP 105 for an incident reporting that initiates from users' mobile devices. Both the reporting and alert posting interfaces may be callback interfaces, defined as WebServices, that an ADE client, such as the AMP 105, implements. While both the reporting and alert posting interfaces may require the registration of a service point with the ADE 103, the reporting interface may be transient in nature. This is so because the reporting functionality only needs to be available for the lifetime of the corresponding alert, while alert posting functionality may be permanent, as alerts can be posted by users at any time.

The Alert Management Platform (AMP) 105 may expose the functionality of the above-mentioned ADE 103 interfaces, thus providing the interne security alert capabilities to users 111, such as, for example, creating users and groups, listing users and groups, publishing alerts, posting alerts, and viewing reports on published alerts. In the example illustrated in FIG. 1, the AMP 105 may expose five interfaces, used to support provisioning, alerting, reporting, searching, and publishing, respectively.

The publish interface, for example, may use specialized content indexing and archiving software, such as, for example, AT&T's Medialogger software to provide content publishing services. Publishing may include features such as speech recognition, video sampling, and transcript alignment. Thus, a content provider 111 may push media files and metadata to the AMP 105, and request the media to be indexed. The AMP 105 may then convey this information to the Storage and Multimedia Indexing Engine (SME) 107, for indexing and storage into the Media Database 109. The indexing function may generate a downloadable or searchable XML file, which is then stored in the Media Database 109. Thereafter, the content provider or other user 111 may search/retrieve this multimedia content through the search interface.

Database 109 may also contain user-specific data, such as personal profile information for the users of system 101. These users may be associated with registered mobile devices, or may have their personal user profile information stored independently of any specific device. Such user-specific data may include, for example, personal information for the mobile device user, the groups of security alerts that the mobile device is registered to receive, and the hardware and software associated with the mobile device for customizing the message format. Note that this user-specific information may be stored in database 109, or may alternatively be stored in a separate database or storage device (not shown) connected with system 101.

Similarly, the provisioning interface may allow users 111, through the AMP 105, to add, delete or edit recipients and their devices. This interface may be important in certain illustrative embodiments in the which ADE 103 may require all user and device information to be pre-provisioned. In such embodiments, the relevant user profile information is already available to ADE 103 at the time of the alert submission in order to efficiently perform the dissemination. A second provisioning interface may be dedicated to the AMP 105 preference set. Thus, it may allow the ADE 103 to be tailored for each AMP 105 client in term of some QoS parameters and end-user interfacing aspects.

Another aspect of the provisioning interface allows the addition/removal of user groups, the addition/removal of individual users from existing groups, or the listing of existing groups and group users. Groups may be created to simplify the dissemination of internet alerts to multiple users. A group may be a flat list structure, containing a plurality of users which will receive the same internet security alert. Groups may be created by users or by the ADE 103 in response to incoming security data. For example, if there is a need to notify all users in a particular location, say Morris county, the ADE 103 may create a group with the appropriate users in it, using the provisioning interface, and subsequently use this group object for dissemination via the alert interface e.g. gid:/MorrisCounty. Users may also be grouped according to particular criteria dependent on the client application logic needs.

The alert posting interface of the ADE 103 validates incident reports submitted by a front-line mobile user and subsequently publishes them to the AMP 105 for verification. The AMP 105 will then decide what to do with the alert and disseminate the alert to further recipients if needed. If the alert is successfully validated, the ADE 103 may generate an alert key and present a confirmation via an alert key to the alert publisher. An alert key may be, for example, made up of two parts, one provided by the submitter AMP 105 and one provided by ADE 103, and may be expected to be unique upon concatenation of these two parts. When an alert is submitted by a mobile user or external content provider 111, the ADE 103 initiates a validation and expansion process, which aze applied to the alert specification. If the alert is successfully validated, the ADE 103 may generate an alert key and return this key to the content provider 111. Future operations related to this alert may require the mobile device user or external content provider 111 to present use this alert key. For example, when the same user 111 desires to cancel the alert, or to generate an alert report, the user 111 may interact with alert interface of the AMP 105 and providing the alert key to the supported interface functions, to cancel or report on the event.

A notification interface may inform the ADE 103 to disseminate a particular message to a set of users and defines the rules under which this process should be executed. It also allows for the management of previously submitted alerts: partial or complete alert cancellation, report push, dissemination status checking.

A reporting interface may be a callback web service interface that needs to be implemented by the AMP 105 system. Through the reporting interface the AMP 105 can register a callback address to which dissemination reports are to be sent following a certain alert dissemination request.

An acknowledgement interface may allow a recipient to provide confirmation that the user has received the alert. These acknowledgements may be optional, and when acknowledging an alert, the user may be free to acknowledge through any channel it desires, rather than being restricted to the channel used to deliver the alert. In one illustrative embodiment, further notifications from all channels may be cancelled from the dissemination policy as soon as a user acknowledges the alert. This behavior may be changed through the corresponding acknowledgement constraint. Additionally, every acknowledgement may be tracked and reported in detail, including, for example, the acknowledgement channel, retrieval time, and the message.

Nevertheless, it will often be more convenient to perform the acknowledgement through the same channel as the one used for delivery. This process may be called 'implicit acknowledgement' and is realized by replying to the message carrying the alert. The ADE 103 offers this feature on channels capable of matching between two PDUs, one outgoing and one inbound: email, voice (a special case), SMS(limited). Compared to 'explicit acknowledgement', which can be done through any channel, including the one used for delivery, the implicit acknowledgement may be faster by reducing the amount of user interactions, which are usually difficult on small devices.

As described above, the architecture shown in FIG. 1 may be further extended to allow for other ADE 103 clients besides the AMP 105. These clients may be application service providers (not shown) that offer their services based on an open standards approach. In certain embodiments, the present disclosure allows for the decoupling of the communication carriers from the service_providers and is thus generically applicable to disseminating information from a large set of content providers to a variety of communication devices. In such managed service embodiments, open XML based communication may be supported with ready made standards like, for example, Parlay/OSA (Open Service Access) formulated by the 3GPP protocol. Since the ADE 103 is accessible via a set of WebService interfaces, the present disclosure may be an open system that can be integrated with any software solution in need of a notification function. Examples of applications that could benefit from alerting services are regular use applications like stock tickers, traveler information systems, and emergency preparedness. Since a generic interface and system implementation is described such that any AMP-like system can be coupled with the ADE 103, there are more possibilities for supporting internet security alerts than the illustrative architecture shown in FIG. 1. Additionally, the messaging framework can deliberately choose a specific network access protocol based on the network provider characteristics and the message delivery requirements. For example, MMS messaging may be enabled via a service provider's network resource gateway (NRG) interfacing with a multimedia messaging center (MMSC) residing at a cellular service provider. Alternatively, MMS messaging can also be enabled by bypassing a network resource gateway and contact the MMSC of a cellular service provider. Such embodiments may, of course, still use the major components of the above-discussed architecture, for example, the ADE 103, AMP 105, and SME 107 components, to support multimedia internet alerts on the mobile devices of their subscribers.

Figure 2:
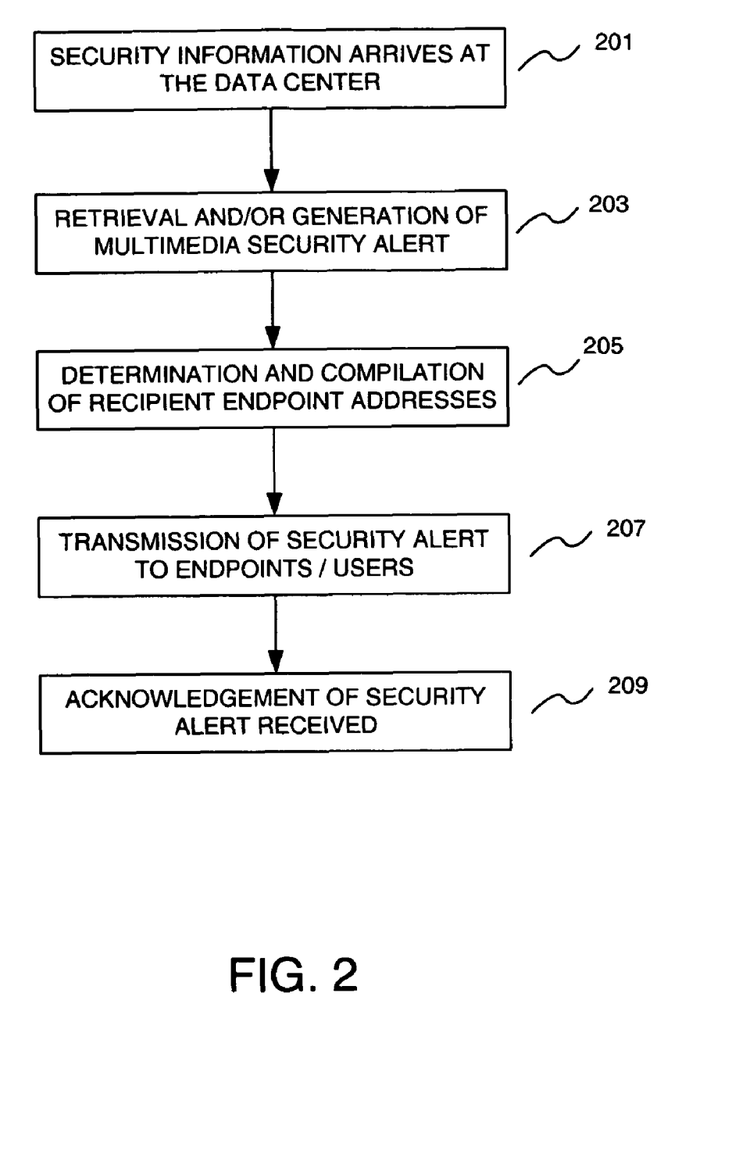
FIG. 2 is a flowchart showing illustrative steps for receiving data and disseminating an internet security alert, in accordance with an embodiment of the present disclosure.

FIG. 2 is a flowchart illustrating the reporting of a security alert in accordance with certain illustrative embodiments. In step 201, security-related information arrives at a data center. The data center may have one or more secure servers and/or message delivery routers which are dedicated to receiving, storing, and transmitting such security information to customers. Indeed, multiple computers at the data center may be individual pieces of a completely distributed deployment made up of a set of gateways and servers. These servers may be exact replicas used for load balancing and enhanced reliability. Such a system may operate as a dynamic peer-to-peer environment, with servers and gateways discovering their capabilities dynamically, and depending on the use case, each one using the services deployed in others. Further, such a system may support dynamic removal or addition of servers to the system. Similarly, illustrative embodiments of the present disclosure support architectures where it is possible to separate gateways and servers into different groups, and then dynamically adjust the numbers of gateways and servers in each group in order to accommodate a higher overall message throughput.

The security information may be any data relevant to the system users. In fact, as mentioned above, the information need not be security information and other regular use applications may benefit from alerting services described herein. The security information in step 201 may come from a variety of different local and remote sources, which may operate inside the data center or may be transmitted from external content providers or mobile device users. As an example, antivirus software running on an intranet server in a customer's network may periodically report virus activity to a server at the data center. Similarly, an external internet traffic monitoring source may act as an external content provider, sending internet health and traffic reports to the data center. Security information may also, for example, be related to an outbreak of a virus or a customer's system infringement detected by AT&T's InternetProtect® software. A data center may receive and store this information by subscribing to several different internet security sources, and continuously monitoring locally installed system and network diagnostic software, and other news sources.

In step 203, the data center creates a multimedia security alert in response to the relevant security information received. In certain illustrative embodiment, the multimedia security alert is generated entirely after the receipt of the security information. For example, after a security event arrives at the data center, a transcript of the security event may be generated, which may then be read on camera by a newsreader as part as short video segment produced at the data center. Alternatively, a list of all possible security alerts may be prerecorded and stored in a database at the data center. Each possible category of security event may have a corresponding prerecorded multimedia security alert. Thus, in such embodiments, the process of generating security alerts may be completely automated.

In yet other embodiments, a combination of the above-described techniques may be used to generate a multimedia security alert. A prerecorded set of multimedia alerts may be stored at the data center, where each multimedia alert may be customized to an individual security event. Such customization may occur automatically or through human intervention to supplement the prerecorded security alert. For example, a security alert for virus outbreaks may be prerecorded with standard virus protection and response information, information which is likely to be the same for each new instance of a network virus. The prerecorded alert may then be supplemented with specific virus information, such as the virus name, severity level, and the scope of affected systems.

In step 205, the data center compiles a list of user addresses to send the security alert. The users selected to receive the security alert may be all or a subset users registered with the system. In the case of a large-scale security event, it may be desirable to immediately notify all system users. Other security events may only be relevant for particular system users. In many instances, recipient users may be information technology (IT) professionals responsible for security and stability of organizational data systems. Since different organizations, depending on the size and sophistication of the organization, may have dramatically different information requirements, the criteria for selecting recipient users may depend on, for example, the user's system hardware, platform, server software. Other additional factors may determine which users receive different security alerts, such as the geographic location of the user's system, or the individual preferences of the IT professionals representing the organization. For example, as described in detail below, when a user registers for security alerts, they may have an opportunity to choose the categories of alerts that they would like to receive. This data may be stored in the media database 109, or another related database. Such information may be stored with personal user profile information, and may be used in system 101 to further personalize the multimedia messages based on personal user information, user preferences such as alert categories, or mobile device information such as the hardware and software associated with the mobile device.

In step 207, the security alerts are sent out from the data center to the identified set of users selected to receive the alert. Each registered user may have an associated address which corresponds to a network address for the user's mobile device. The security alert submission may be provided in both synchronous and asynchronous modes to a recipient user. An asynchronous mode may allow for the submission of large alerts, with perhaps thousands of endpoints, and may provide information concerning the processing outcome through the reporting interface. For these large alerts it may be important to decide on the desired quality of service (QoS) level. The tracking and persistence of channel delivery information are examples of resource consuming operations. Accordingly, in certain embodiments, the alert notification interface may be extended to allow specifying of the desired QoS level on a per alert basis. Additionally, in certain embodiments, techniques may be incorporated into the alert delivery mechanisms described herein to reduce or even prevent alert spoofing. For example, a verification callback to the alert server, an encrypted delivery channel (e.g., an an email using secure MIME), or digitally signed content may be used to prevent a malicious party from forging an alert to mobile users.

According to another aspect of the present disclosure, when a user receives a security alert, the user will also be provided the capability to query and retrieve other related video segments that pertain to this alert or to the user's previously-specified interests.

While multimedia content, such as streaming video webcasts are now supported by a wide variety of mobile devices, hardware, software, or network conditions may prevent a complete full motion video with audio to be downloaded to a mobile device when a security is to be sent to a user of the device. In such instances, the content can include shortened video clips or may be limited to some combination of audio, still digital images, and text. Additionally, multimedia analysis techniques may be used to determine if different security alerts contain information about the same topic or even contain the same streaming video material, and if so, may take action to reduce the load on the mobile device and/or the mobile network. For example, if multiple similar or even redundant video alerts are to be sent to a single user, the data center may, for example, use multimedia extraction and segmentation techniques to parse out the redundant multimedia content in one or more of the alerts.

An illustrative embodiment of this message customization involves the use of the AT&T eClips, or a similar personalized multimedia delivery service as described in co-pending application Ser. No. 10/034,679, hereby incorporated by reference in its entirety. As an example, AT&T eClips is designed to use multimodal processing in the domain of broadcast television content with the goal of automatically producing customized video content for individual users. Multimodal topic segmentation is used to extract video clips from a wide range of content sources which are of interest to users as indicated by the user's profile. eClips may primarily use the Closed Caption as the text source, although the textual information may come from a variety of sources including-post-production scripts, very large vocabulary automatic speech recognition, and transcripts which are aligned with audio using speech processing methods.

In this example, AT&T eClips is a personalized multimedia delivery service, which may use a personal profile for each user to search multiple content feeds for relevant video clips. These personal user profiles and other user-specific information may be stored in database 109, in a separate database on the same server, or in another storage location (not shown) connected to system 101. The multimedia processing of audio, video and text may be used as input to automate the segmentation of some video content to individual story clips.

In this example, AT&T eClips also uses a format conversion, or transcoding, operation once the multimedia file in generated, to build and store the same internet alert in multiple published forms. With eClips, a transcoding operation results may, for example, result in the following seven files stored in the eClips system, each of which may have substantively the same internet security information: (1) video150.wmv, a 150 kbps file for a PDA or a smartphone; (2) video.3gp, a 3GPP formatted file (e.g., 64 Kbps); (3) audio-.wav, a 16 kbps audio file for a PDA or smartphone; (4) audio.mp3, a 16 kbps audio file for a PDA or smartphone; (5) audio.amr, a AMR audio file for a PDA or smartphone; (6) images.jpg, a representative frame shot of the incoming video clip; and (7) transcript.txt, a transcript of the report read by the newsreader.

Also in this example, the eClips service may be built within a system that provides the data acquisition, processing, storage and delivery capabilities for the service. For example, a security event video may be received at the data center, then subsequently segmented and classified so that it can be intelligently searched in an automated manner.

In certain embodiments, the delivered messages may be podcasts. The commonly known podcasting technology may allow the alert server to publish files to the Internet, allowing users to subscribe to a feed and receive the alerts automatically.

In the optional step 209, an acknowledgement may be sent from the mobile device back to the data center, indicating successful delivery of the security alert. An acknowledgement may be automatically returned from the mobile device to the data center as soon as the mobile device user responds to the alert on the screen of the mobile device. The data center may store the incoming acknowledgements for tracking purposes. Acknowledgements may be tracked and reported to interested subscribers as part of an alert report, providing such information as the acknowledgement channel, retrieval time, and the alert ID of the acknowledged message.

However, many internet alert systems may not demand or even desire for acknowledgements to be returned from mobile devices. It should be understood that the architecture of the present disclosure supports systems in which acknowledgements may be unnecessary or undesirable, as well as systems that require acknowledgements from some or all message recipients. When transmitting an alert, the data center may embed an acknowledgement constraint in the structure of the internet alert. As discussed in detail below, the acknowledgement constraint may be specific to a set of endpoints, or user recipients, from which confirmation of an alert delivery is requested. Such constraints may be used to nominate user-specific or channel-specific acknowledgements. In contrast, as is further described below, acknowledgement constraints may also be embedded into the message format of the security alert such that the acknowledgement constraint applies to all recipients of the alert. In certain embodiments, the data center may take action based on the receiving or not receiving of an acknowledgement from a recipient user.

Figure 3:
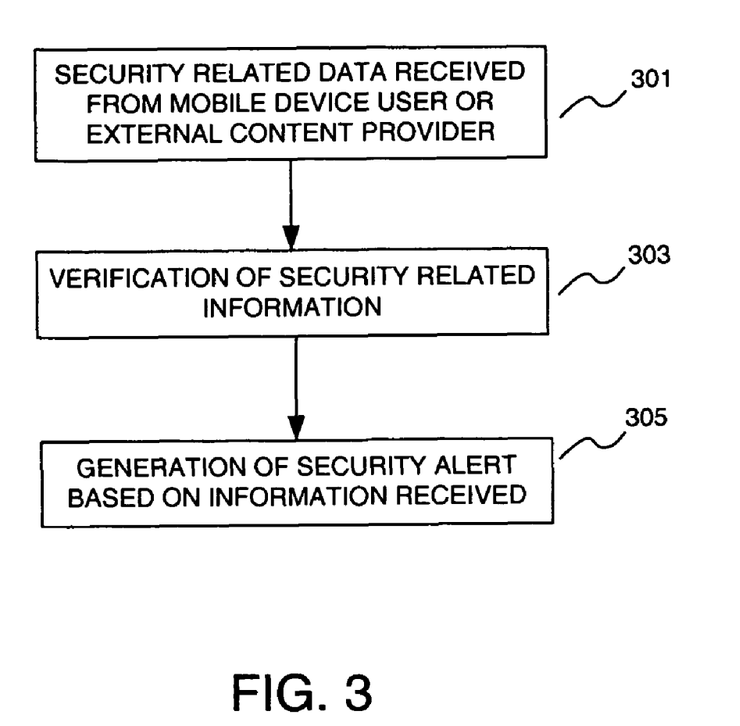
FIG. 3 is a flowchart showing illustrative steps for generating a security alert, in accordance with an embodiment of the present disclosure.

FIG. 3 is a flowchart describing the generation of a security alert in accordance with certain illustrative embodiments. In step 301, incident report or other security related information is received at the data center. The security information may come from a mobile device user, an external content provider, or from other source. As many handheld mobile devices are capable of capturing and transmitting multimedia content, an incident report sent by a mobile device user may include an embedded video clip with audio recorded by the mobile device user. In other situations, the incident report may include audio data, digital images, or text input by the mobile device user. Similarly, security related information from an external content provider, such as notifications from installed network or system software, or reports from other news sources, may arrive in any combination of video, audio, image, or textual formats.

In step 303, the received user incident report is verified at the data center. Unlike a trusted internet security data source, such as secure system antivirus software, internet traffic monitoring tools, or a trusted global news source, the information provided by the mobile device user may need to be independently confirmed. If the user's incident report is verified, a multimedia security alert may be generated based on the incident report in step 305, using the techniques discussed above in relation to FIG. 2.

Figure 4:
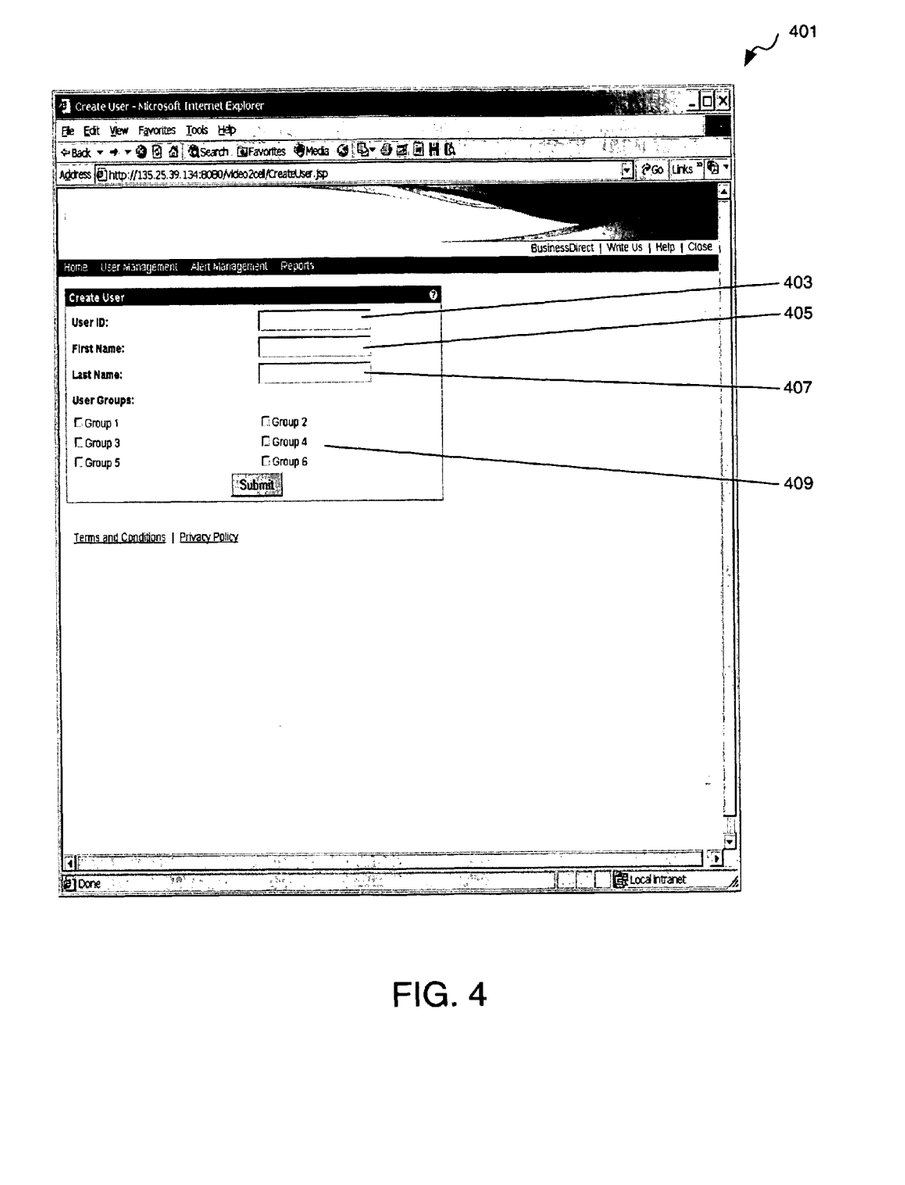
FIG. 4 is a screenshot showing a user-creation user interface, in accordance with an embodiment of the present disclosure.

FIG. 4 is a screenshot demonstrating user creation in accordance with certain illustrative embodiments. The screenshot in FIG. 4 is part of the illustrative Video2Cell prototype developed by AT&T. Video2Cell is a web-based application integrated as part of AT&T's InternetProtect® software, developed to facilitate alert distribution to InternetProtect customers using mobile devices such as mobile phones or personal digital assistants (PDAs) capable of receiving multimedia updates. FIG. 4 is a screenshot of the Create User web-based user interface (UI) 401 of the Video2Cell application. A user may interact with the Create User UI 401 by entering a valid UserID and the user's first and last name into text boxes 403, 405, and 407, respectively. Additionally, the user may select a user group to subscribe to by clicking one or more of the check boxes 409. After entering and submitting the information in the Create User UI 401, the user is enrolled to receive security alerts corresponding to the group selected by the user. For example, Group 1 may correspond to only the highest severity security events, such as the outbreak of a virus on the user's network. While Group 6, for example, may correspond to all security and system status updates on the customer's system. Thus, by selecting one or more groups, a user has control over the volume and type of security alerts will which be received.

Figure 5:
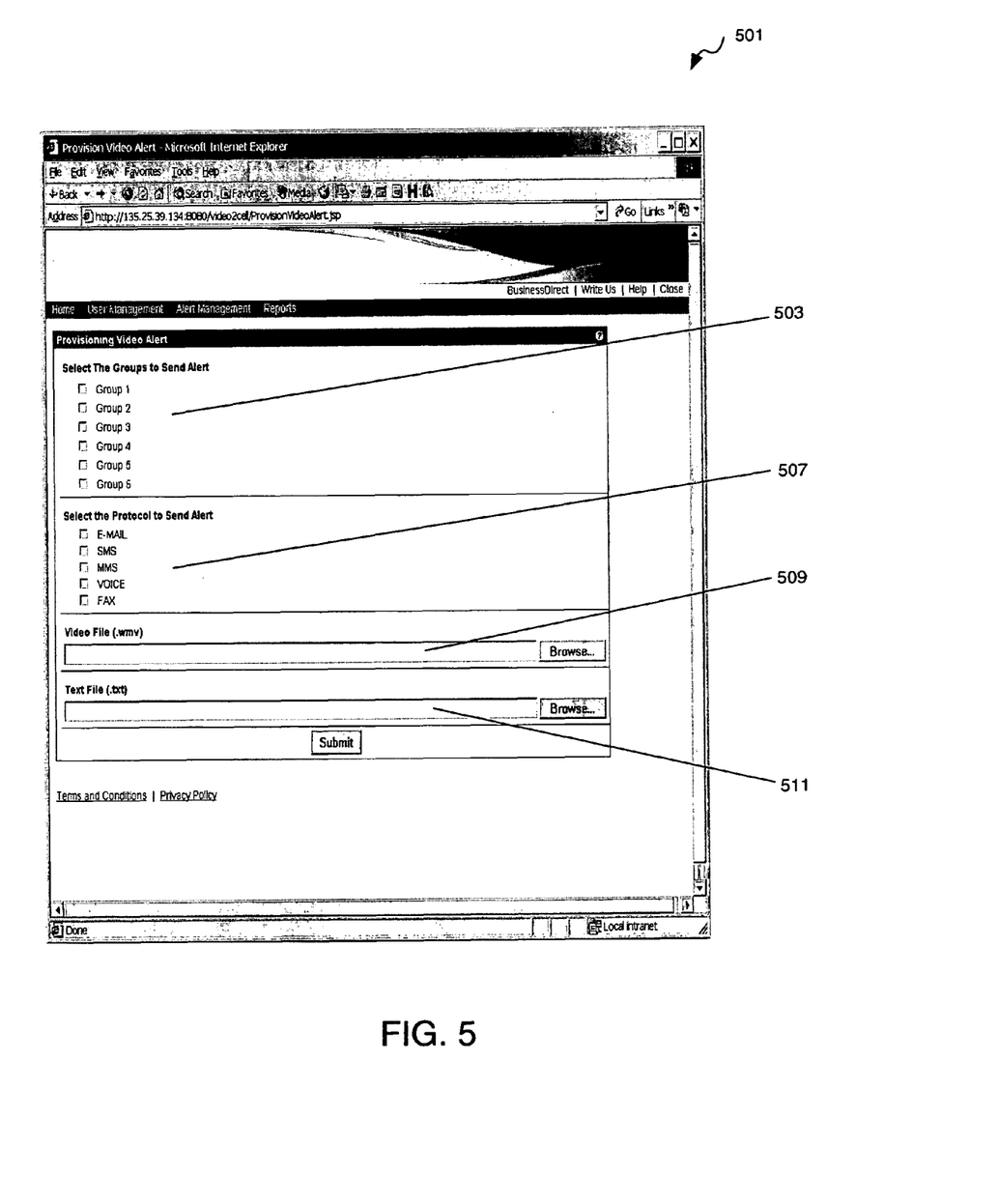
FIG. 5 is a screenshot showing an alert dissemination user interface, in accordance with an embodiment of the present disclosure.

FIG. 5 is a screenshot demonstrating an illustrative alert dissemination UI 501. The screenshot in FIG. 5 is part of the Video2Cell prototype application used to transmit internet alerts to registered users. An administrator may interact with the Provisioning Video Alert UI 501 to transmit internet alerts to selected groups of users. The administrator may be, for example, an incident commander working at the data center. The incident commander selects the user group to notify by clicking the corresponding group checkbox 503.

The incident commander may then select the appropriate transmission protocol checkbox 505, depending on the media type of the internet alert. For example, the MMS protocol may be selected to send a streaming video internet security alert. As described above, a single internet alert may be generated in multiple different media forms, for example, various streaming video and audio formats, as well as still images and text. The appropriate protocol selected by the incident commander may depend on the category of security alert, or on the media capabilities of the mobile devices in the selected group.

The incident commander may then identify the media file corresponding to the streaming video internet alert by entering the file path in the Video File text box 507. The Text File textbox 509, may be used in conjunction with the Video File text box 507, or as an alternative. As stated above, the described media types for the internet alert may depend on the category of the alert and on the recipient mobile devices.

Figure 6:
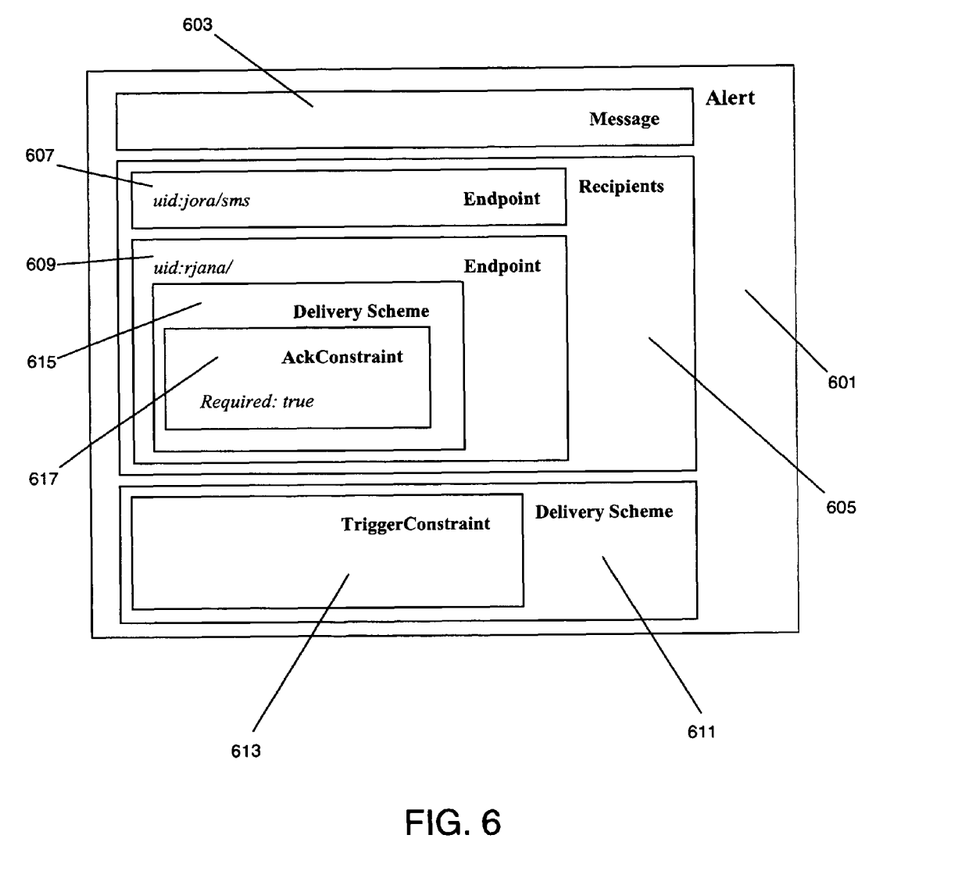
FIG. 6 is a schematic block diagram showing a data structure representing an internet alert, in accordance with an embodiment of the present disclosure.

FIG. 6 is a schematic block diagram showing the structure of an internet alert 601, in accordance with certain illustrative embodiments. In this example, the alert 601 constitutes an alert ID (not shown), a message 603, a set of recipients 605, and a set of delivery constraints that make up the delivery scheme 611. The set recipients 605 of the alert 601 are represented by one or more endpoints 607 and 609 encapsulated within the recipient set 605. An individual endpoint may represent one or a group of recipient addresses to which the alert 601 should be delivered.

The ADE 103 interfaces may incorporate the use of endpoints as a generic way of specifying the recipients of an alert message. In certain illustrative embodiments, an endpoint may have the following syntax: recipient_type:recipient_id/ channel_id:channel_address. In this example, the first two parts, the recipient type and the recipient identifier are mandatory, while the channel identifier and the channel address specification are optional. Further, there may be two recipient types that are recognized, 'uid' for user and 'gid' for group. An endpoint may be complete, for example, uid:jora/mms:+19733608298. In contrast, an endpoint may be more vaguely specified, for example, uid:jora/mms, so as to make it incomplete. An expansion process may take place during which all the incomplete endpoints are resolved, through the alert provisioning database, into a set of complete endpoints. In the expansion process, a single incomplete endpoint may be expanded into multiple implied endpoints. For example, an incomplete endpoint specified as uid:jora/mail may be expanded to the implied endpoints uid:jora/mail: jora@research.att.com and uid:jora/mail: serbanjora@yahoo.com, if these two accounts of type mail were pre-provisioned.

A delivery scheme may generally represent the set of constraints that control the different aspects of the alert dissemination process. In certain embodiments, such as the example shown in FIG. 6, a delivery scheme 611 may be associated with an alert 601, or instead a delivery scheme 615 may be associated directly with an endpoint 609 of the alert 601. Thus, two data types in this interface are said to be constrained: the alert and the endpoint data types. Additionally, a delivery constraint may act on a set of endpoints, such that only in-scope endpoints can be referenced from the delivery constraint. In FIG. 6, for the alert-level constraint 613, the constraint 613 will act upon all in-scope endpoints 607 and 609, that is, those endpoints explicitly specified as recipients of the alert 601 and the endpoints they imply. In contrast, for the endpoint-level constraint 617, the constraint 617 will act only upon the endpoints implied by the endpoint 609.

While two illustrative examples of delivery constraints are discussed herein, the set of delivery constraints may be extended through the definition of new types and corresponding implementation of the new constraints within the ADE 103.

As an example of a delivery constraint, a trigger constraint may define the notification procedure to be followed for a set of endpoints. Endpoints may be grouped during notification attempts that share the same relevant trigger parameters, such as the number of delivery attempts and the timeout settings. Attempts inside a trigger constraint may be compiled, or scheduled for delivery, with respect to a delivery "plan." For example, delivery plans such as sequential and broadcast may help determine the scheduling of delivery attempts.

Another example of a constraint, an acknowledgement constraint, may specify the set of endpoints (user level, e.g. uid:jora/) from which the ADE 103 may expect an explicit confirmation of alert message delivery. This constraint can be used to nominate user specific or channel specific acknowledgements.

For all constraints in the delivery scheme one can specify the set of endpoints for which they apply. This set must be a subset of the main recipient (endpoint) list in its expanded form: the ADE 103 checks if all specified endpoints are in-scope, i.e. they satisfy an 'imply' relationship with regard to an alert level declaration. Attaching a delivery scheme to a particular endpoint can further refine the specification: this is only allowed for the endpoints specified at alert level and is mostly useful for refinements of the main delivery scheme.

While the foregoing descriptions and the associated drawings may relate to receiving and disseminating internet security alerts, many modifications and other embodiments will come to mind to one skilled in the art having the benefit of the teachings presented.

What is claimed is:

1. A method of providing security alerts to at least one mobile device comprising:
    receiving at a security message delivery router security data indicative of a category of security alert, the security data received through an alert posting interface, the security message delivery router part of an alert dissemination engine, the alert posting interface for receiving and validating the security data, wherein when the security data is validated an alert key is generated and returned to a provider of the security data, the alert key being a concatenation of a first part provided by the alert posting interface and a second part provided by the alert dissemination engine, the alert key for future operations related to the security data, the future operations including one or more of canceling an alert associated with the security data and generating an alert report;
    accessing a database comprising a plurality of prerecorded multimedia messages, wherein each prerecorded multimedia message corresponds to a security alert category;
    matching the received security data to at least one prerecorded multimedia message in the database;
    customizing the at least one matching prerecorded multimedia message by supplementing said at least one matching prerecorded multimedia message with additional content describing the received security data, the additional content including a security level and a scope of affected systems;
    associating the received security data with at least one mobile device;
    determining an address for each of the at least one associated mobile devices; and
    delivering the at least one matching prerecorded multimedia message to each determined address.

2. The method of claim 1, wherein the received security data comprises a video stream, and the customizing the at least one matching prerecorded multimedia message comprises:
    identifying a relevant portion of the video stream of the received security data; and
    integrating the relevant portion of the video stream of the received security data into the at least one matching prerecorded multimedia message.

3. The method of claim 2, wherein multimedia analysis techniques are used to automatically identify the relevant portion of the video stream of the received security data.

4. The method of claim 1, wherein the received security data comprises an audio stream, and the customizing the at least one matching prerecorded multimedia message comprises:
    performing a speech recognition analysis on the audio stream of the received security data;
    indexing the audio stream based on the speech recognition analysis;
    identifying a relevant portion of the audio stream; and
    integrating the relevant portion of the audio stream of the received security data into the at least one matching prerecorded multimedia message.

5. The method of claim 1, wherein the customizing the at least one matching prerecorded multimedia message comprises:
    generating additional multimedia content by recording a newsreader describing the received security data; and
    integrating the generated additional multimedia content into the at least one matching prerecorded multimedia message.

6. The method of claim 1, further comprising receiving an acknowledgement from a first of the at least one mobile devices indicating successful delivery of the at least one matching prerecorded multimedia message.

7. The method of claim 1, further comprising delivering links to each determined address, wherein the links direct a mobile device user to additional information related to the at least one matching prerecorded multimedia message.

8. The method of claim 1, wherein the associating the received security data with at least one mobile device comprises retrieving user security category alert preferences from a user database.

9. A method of providing a security alert to a mobile telecommunications device user comprising:
    receiving at a server a security alert data message indicative of a category of security alert, the security alert data message received through an alert posting interface, the alert posting interface for receiving and validating the security alert data message, wherein when the security alert data message is validated an alert key is generated and returned to a provider of the security alert data message, the alert key being a concatenation of a first part provided by the alert posting interface and a second part provided by the server, the alert key for future operations related to the security alert data message, the future operations including one or more of canceling an alert associated with the security alert data message and generating an alert report;

associating the security alert data message with a mobile telecommunications device user impacted by the security alert data message;

generating a multimedia message based on the security alert data message and user-specific information, wherein generating the multimedia message comprises identifying a prerecorded streaming video message corresponding to the category of the security alert data message, and customizing the prerecorded streaming video message to include additional content describing the security alert data message, the additional content including a security level and a scope of affected systems; and transmitting the multimedia message to the mobile telecommunications device user.

10. The method of claim 9, wherein the multimedia message comprises a podcast.

11. The method of claim 9, wherein the transmitting the multimedia message to the mobile telecommunications device user is done asynchronously.

12. The method of claim 9, wherein the transmitting the multimedia message to the mobile telecommunications device user is done in accordance with the MMS network protocol.

13. The method of claim 9, further comprising receiving at the server an acknowledgement indicating that the multimedia message has been received by the mobile telecommunications device user.

14. The method of claim 9, wherein the generating the multimedia message based on the security alert data message and user-specific information comprises:

generating the additional multimedia content by recording a newsreader describing the received security alert data message; and integrating the additional multimedia content into the prerecorded streaming video message corresponding to the category of the security alert data message.

15. A non-transitory computer readable medium storing computer readable instructions that, when executed by a computer, perform a method for providing security alerts to mobile devices comprising:

receiving at a server a data report indicative of a category of security alert, the data report received through an alert posting interface, the alert posting interface for receiving and validating the data report, wherein when the data report is validated an alert key is generated and returned to a provider of the data report, the alert key being a concatenation of a first part provided by the alert posting interface and a second part provided by the server, the alert key for future operations related to the data report, the future operations including one or more of canceling an alert associated with the security alert data message and generating an alert report;

maintaining a database comprising of a plurality of multimedia messages, wherein each multimedia message corresponds to a security alert category;

retrieving from said database a multimedia message based on a security alert category associated with the received data report;

customizing the retrieved multimedia message by supplementing said multimedia message with additional content describing the data report, the additional content including a security level and a scope of affected systems;

identifying a plurality of mobile devices addresses associated with the received data report; and transmitting the multimedia message to each identified mobile device address.

16. The computer readable medium of claim 15, wherein the transmitting the multimedia message to each identified mobile device address is done asynchronously.

17. The computer readable medium of claim 15, wherein the transmitting the multimedia message to each identified mobile device address is done in accordance with the MMS network protocol.

18. The computer readable medium of claim 15, wherein the method further comprises receiving at the server an acknowledgement from a mobile device indicating that the multimedia message has been received by the mobile device.

19. The computer readable medium of claim 15, wherein the received data report comprises a video stream, and the customizing the retrieved multimedia message comprises:

identifying a relevant portion of the video stream of the received data report; and integrating the relevant portion of the video stream of the received data report into the retrieved multimedia message.

20. The computer readable medium of claim 19, wherein the method further comprises using multimedia analysis techniques to automatically identify the relevant portion of the received data report.

* * * * *